United States Patent
Otero

(10) Patent No.: US 8,012,515 B1
(45) Date of Patent: Sep. 6, 2011

(54) METHOD FOR PREPARATION OF HERBAL BEVERAGE

(76) Inventor: Douglas Otero, Miami, FL (US)

( * ) Notice: Subject to any disclaimer, the term of this patent is extended or adjusted under 35 U.S.C. 154(b) by 0 days.

(21) Appl. No.: 12/803,828

(22) Filed: Jul. 7, 2010

(51) Int. Cl.
*A01N 65/00* (2009.01)
(52) U.S. Cl. .................................................. 424/725
(58) Field of Classification Search .................. None
See application file for complete search history.

(56) References Cited

PUBLICATIONS

Volpato et al., Economic Botany, 58 (3), pp. 381-395, 2004.*

* cited by examiner

*Primary Examiner* — Michael Meller
(74) *Attorney, Agent, or Firm* — John H. Faro

(57) ABSTRACT

A process for the preparation (decoction) of an herbal beverage from China Root (*Smilax domingensis* Willd), Bejuco indio (*Gouania polygama*) and Pimento leaves (*Pimenta dioica* Merr) and a modulation effective amount of Ginger root (*Zingiber offiicinale*); and the product prepared in accordance with this process.

3 Claims, No Drawings

METHOD FOR PREPARATION OF HERBAL BEVERAGE

BACKGROUND OF THE INVENTION

1. Field of the Invention

This invention relates to an herbal beverage, and to a method of manufacture. More specifically, this invention is a process for manufacture of an improved herbal beverage having therapeutic properties, and to a stabilized herbal beverage prepared in accordance with this process.

2. Description of the Prior Art

The use of herbal remedies has been and continues to dominate many cultures, particularly cultures that trace their roots back to Africa, and to the native Indians in the north, central and south Americas. Many of these remedies are derivative from plants, (both the fruit/berries/flowers and to the roots/bark) to a lesser extent from insects and animals. This is particularly true in the Caribbean, including the country of Cuba, which has, over the years, produced a variety of medicinal therapies based upon a combination of different plant constituents.

For example, the beverage Pru is a traditional refreshment and medicinal drink produced by their decoction and fermentation with sugar. It is claimed to have hypotensive, stomachic, depurative, and diuretic properties. Pru has long been confined to a number of traditional villages in eastern Cuba, and its origin may be traced back to the ethnobotanical knowledge of French-Haitian people that migrated to Cuba from the end of the 1700s. With the economic crisis of the early 1990s that resulted in the disappearance of industrial soft drinks in Cuba, and in the search for new income sources, pru spread across almost the entire island. This has resulted in the commoditization of the drink and related traditional knowledge, and possibly in increasing pressure on the species' wild populations Many of these herbal remedies are mixtures of various natural ingredients, and, the literature is replete with empirical evidence of their effectiveness, and/or their perceived effectiveness. Because of its multicultural heritage, such herbal remedies abound; and, the inhabitants of Cuba have routinely preferred and entrusted their well-being to natural therapeutics for years. A survey article has identified over 170 plant species, that are utilized in 199 formulas, Cano & Volpato, *Herbal Mixtures In Traditional Medicines of Eastern Cuba*, J. Ethnopharmacology, Vol. 90 (2004) 293-316.

OBJECTIVES OF THIS INVENTION

It is the object of this invention to remedy the above as well as related deficiencies in the prior art.

More specifically, it is the principle object of this invention to provide an improved method for the manufacture of an herbal beverage known in Caribbean countries as "Pru".

More specifically, it is the principle object of this invention to provide an improved method for the manufacture of an herbal beverage prepared from mixture of extracts of China Root (*Smilax domingensis* Willd), Bejuco indio (*Gouania polygama*) and Pimento leaves (*Pimenta dioica* Merr), that is both stable and relatively free from undesirable fermenting complexes.

It is another object of this invention to provide an improved method for the manufacture of an herbal beverage prepared from mixture of extracts of China Root (*Smilax domingensis* Willd), Bejuco indio (*Gouania polygama*) and Pimento juice (*Pimenta dioica* Merr) that is both therapeutic and yet has relatively mild, if any, side effects.

It is yet another object of this invention to provide an improved method for the manufacture of an herbal beverage prepared from mixture of extracts of China Root (*Smilax domingensis* Willd) Bejuco indio (*Gouania polygama*) and Pimento juice (*Pimenta dioica* Merr) containing a natural stabilizing ingredient that does not detract from the taste or appearance of the herbal beverage.

Additional objects of this invention an herbal beverage prepared from the improved manufacturing methods of this invention.

SUMMARY OF THE INVENTION

The above and related objects are achieved by an improved method for the preparation (decoction) of an herbal beverage from China Root (*Smilax domingensis* Willd), Bejuco indio (*Gouania polygama*) and Pimento leaves (*Pimenta dioica* Merr) and a modulation effective amount of Ginger root (*Zingiber offiicinale*).

In one of the preferred embodiments, a decoction is prepared from a mixture of the foregoing ingredients by adding these ingredients to water containing sugar, preferably unrefined or brown sugar, the water heated to a boil and the heating continued until the water turns a light brown color, and does not change color, or darken any further—generally not in excess of two (2) hours. It is not believed that the relative proportions of the ingredients is critical and can vary over a relatively narrow range, without materially altering the taste or appearance of the resultant beverage. A primer or "catalyst", in the form of an aliquot of a prior batch of the decoction, is added to the mixture to accelerate the extraction process and/or supply some additional yeast for the fermentation of the sugar in the mixture. For the purposes of illustration, and not limitation, in a typical batch (for production of 12 liters of beverage), approximately 1.5 liters of a prior decoction is added to each 12 liters of water, used in the decoction of the foregoing ingredients.

Upon completion of the decoction process, the liquid and solid fractions are now separated from one another by filtration, and the product bottled. After a brief period, the remaining sugar in the bottled product ferments, producing a lightly sparkling beverage. In one of the preferred embodiments of this invention, the bottled beverage can be further polished to increase its clarity

DESCRIPTION OF THE INVENTION

Including Preferred Embodiments

The herbal beverage of this invention is prepared by initially combining the essential ingredients of the beverage, in the proper relative proportions, placing these ingredients in the vessel containing water and sugar (added to taste) and thereafter heating the contents of the vessel to a boil to effect extraction of a water soluble components thereof into the boiling water. The extraction process is essentially complete after about 2 hours. The extraction is believed to be complete when the water turns a light brown color and does not increase in intensity. The addition of the Ginger root is believed to modulate or control the physiological effect of the China root, and thereby stabilize the extract. This modulation of the extract is both unique and beneficial in that it reduces the effect of the China root, which is known and reported to have a sedative effect.

In the preferred embodiments of this invention, an aliquot of a prior batch of the beverage is also added to the vessel, to promote the extraction process, and to prime the interaction of the components within the vessel. The aliquot can be characterized as a "primer" or a "catalyst", in that it is believe to both accelerate and promote the extent of extraction of desirable ingredients from the plant components used in this preparation.

Once the extraction process had been completed, the resultant extract is allowed to cool to room temperature and filtered. The particulates are removed from the liquid fraction by filtration. The filtered fraction contains a suspension of very fine particulate matter, is, thus, generally slightly cloudy. It is assumed that the suspended matter contains a natural yeast. The filtered fraction can be bottled and consumed shortly thereafter. The resultant beverage can be consumed shortly thereafter, (preferably 2 weeks), and is slightly carbonated.

In one of the preferred embodiments of this invention, the filtered extract can be further treated to remove the suspended matter contained therein by polishing or clarifying with any one of the finishing agents used in wine making to polish or clarify wines (e.g. diluted solution of albumin).

The Examples which follow further define, describe and illustrate this invention. Parts and percentages appearing in these Examples are by weight unless otherwise indicated.

EXAMPLE 1

The following ingredients are added, in the following proportions, to a kettle containing 12 liters of water (10×), and 1.2 (1×) liters of a prior decoction of the beverage prepared in essentially the same manner as described herein.

China root—50 grams
Bejuco indio—35 grams
Pimento leaves—15 grams
Ginger root—15 grams
Brown Sugar—1.134 Kilograms (2.5 pounds)

The contents of the kettle are thereafter heated to a rolling boiling and maintained at that temperature until the water in the kettle turns a light brown color, and the color does not darken any further—generally after about 2 hours. The kettle and its contents are removed from stove and allowed to cool to room temperature. The liquid fraction, containing the water soluble components of the foregoing ingredient, are thereafter separated from the solids by filtration (through cheese cloth or other relative course medium). The color of the filtrate remains essentially unchanged. This relatively crude filtration is preferable in that the natural yeast in the decoction is allowed to remain in the liquid fraction at the time bottling occurs The liquid can be bottled, or further clarified/polished by addition of a clarifying agents, such as is typically used in the polishing of wines (e.g. albumin). Once bottled, the resultant liquid is ready for consumption within about a week thereafter.

What is claimed is:

1. A process for the preparation of an herbal beverage by decoction, in water, of a mixture of ingredients consisting essentially of China root, Bejuco indio, Pimento leaves and ginger root, wherein said ginger root is present in said mixture in an amount effective to reduce a sedative effect caused by said China root in said decoction, whereby said decoction of said ingredients yields a herbal beverage, which upon consumption, has a reduced sedative effect.

2. The process of claim 1, wherein for every 10 parts by weight water used in said decoction of the foregoing ingredients, 1.2 parts by weight of a primer is added, wherein said primer is a mixture obtained from a prior batch of a decoction prepared from the same mixture of ingredients as in claim 1.

3. The process of claim 1, wherein for every 1200 parts by weight water and 120 parts by weight of primer, said process involves the decoction of the following ingredients in the following relative proportions:

50 parts by weight of China root;
35 parts by weight of Bejuco indio;
15 parts by weight of Pimento leaves;
15 parts by weight of Ginger root; and
1134 parts by weight of brown sugar.

* * * * *